US006979921B2

(12) United States Patent
Misaki

(10) Patent No.: US 6,979,921 B2
(45) Date of Patent: Dec. 27, 2005

(54) VEHICLE GENERATOR HAVING CIRCUIT PROTECTIVE COVER

(75) Inventor: Koichi Misaki, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/002,492

(22) Filed: Dec. 3, 2004

(65) Prior Publication Data

US 2005/0151435 A1   Jul. 14, 2005

(30) Foreign Application Priority Data

Jan. 14, 2004   (JP) ............................. 2004-006960

(51) Int. Cl.$^7$ .............................................. H02K 7/00
(52) U.S. Cl. ...................... 310/68 D; 310/89; 310/85
(58) Field of Search .......................... 310/68 D, 85–89

(56) References Cited

U.S. PATENT DOCUMENTS

| | | | | |
|---|---|---|---|---|
| 4,076,989 A | * | 2/1978 | Watson ........................ | 310/89 |
| 4,284,914 A | * | 8/1981 | Hagenlocher et al. .... | 310/68 D |
| 4,288,711 A | * | 9/1981 | Hagenlocher et al. .... | 310/68 D |
| 4,546,280 A | | 10/1985 | Pfluger ..................... | 310/68 D |
| 4,757,221 A | * | 7/1988 | Kurihashi et al. ........... | 310/62 |
| 4,841,187 A | * | 6/1989 | Hauke et al. ................ | 310/171 |
| 5,296,772 A | * | 3/1994 | Bradfield et al. ........... | 310/242 |
| 6,034,452 A | * | 3/2000 | Nakamura et al. ........ | 310/68 D |
| 6,492,752 B2 | * | 12/2002 | Ishida ......................... | 310/71 |
| 6,774,518 B2 | * | 8/2004 | Howe et al. .................. | 310/89 |

FOREIGN PATENT DOCUMENTS

| | | |
|---|---|---|
| DE | 197 52 672 C1 | 3/1999 |
| FR | 2 800 928 A | 5/2001 |
| GB | 2 107 130 A | 4/1983 |
| JP | A-62-250053 | 10/1987 |
| JP | A-4-198354 | 7/1992 |

* cited by examiner

*Primary Examiner*—Dang Le
(74) *Attorney, Agent, or Firm*—Oliff & Berridge, PLC

(57) ABSTRACT

The vehicle generator having a circuit protective cover of present invention has a housing, an electric circuit device and a protective cover. The housing encloses a stator on which an armature coil is wound and a rotor located inside the stator to face each other. The electric circuit device is located outside the housing for rectifying AC induced in the armature coil to DC. The protective cover covers the electric circuit device. The protective cover is made of a composite material including a polyamide and an elastomer. It is desirable that the protective cover has a mechanical properties including: a maximum elongation of 10% or higher; and a Charpy impact strength with notch of 78 kJ/m$^2$ or higher.

6 Claims, 6 Drawing Sheets

FIG. 4A

| REQUIRED MECHANICAL PROPERTY | TENSILE STRENGTH | 38 OR HIGHER (MPa) |
|---|---|---|
| | MAXIMUM ELONGATION | 10 OR HIGHER (%) |
| | BENDING STRENGTH | 50 OR HIGHER (MPa) |
| | CHARPY IMPACT STRENGTH (WITH NOTCH) | 78 OR HIGHER (kJ/m$^2$) |

FIG. 4B

| | | | | PRIOR ART | PRESENT INVENTION (AN EMBODIMENT) |
|---|---|---|---|---|---|
| MECHANICAL PROPERTY | TENSILE STRENGTH | 3mmt | MPa | 160 | 50 |
| | MAXIMUM ELONGATION | 3mmt | % | 4.0 | 160 |
| | IZOD IMPACT STRENGTH (23°C) | WITH NOTCH 0.125inch (3.18mm) | J/m | 100 | 1100 |
| | BENDING STRENGTH | 0.25inch (6.35mm) | MPa | 210 | 63 |

FIG. 4C
PRIOR ART

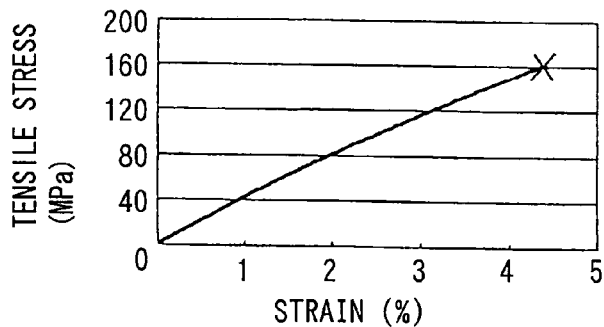

FIG. 4D

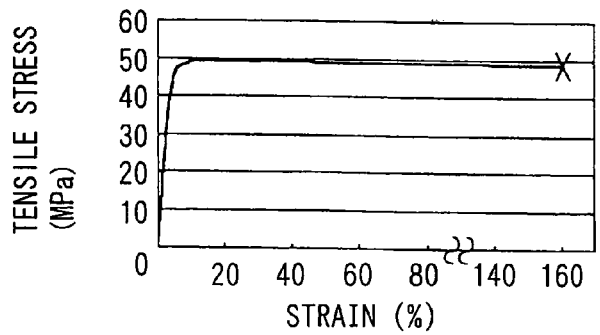

VEHICLE GENERATOR HAVING CIRCUIT PROTECTIVE COVER

CROSS REFERENCE TO RELATED APPLICATIONS

This application is based upon and claims the benefit of priority of Japanese Patent Application No. 2004-6960 filed on Jan. 14, 2004, the contents of which are incorporated herein by reference.

1. Field of the Invention

The present invention relates to a vehicle generator having a circuit protective cover located on vehicles such as cars and trucks, and especially relates to a small vehicle generator whose electric circuit device is mounted outside of a housing and which is effective against a secondary impact thereon.

2. Background of the Invention

A small AC generator located on and driven by an automobile engine comprises an alternator having a stator on which an armature coil is wound, and a rotor located inside of and facing the stator in a housing. A front end frame and a rear end frame fixed to each other constitute the housing. The generator further comprises an electric circuit device located behind the rear end frame and rectifying AC induced in the armature coil to DC. The electric circuit device is connected via a charging circuit to a battery located on the automobile.

The electric circuit device is composed of a rectifier, a brush holder holding a brush, an IC regulator, and so on. A protective cover (rear end cover) fastened to the rear end frame covers the electric circuit device. The protective cover is made of plastics, which insulates electricity, are light in weight, and has high corrosion resistance and low manufacturing cost. Conventionally, plastic protective covers are made of nylon-6,6 (PA66:polyamide66) or FRP (fiber reinforced plastic) including fiberglass therein whose strength is high.

When the automobile collides with any obstacle, an impact sways the engine fiercely and/or deforms the engine compartment. In some cases the AC generator receives a secondary impact by the collision with the structural member of the vehicle and/or with other appliances located on the automobile. If the secondary impact fractures and/or detaches the plastic protective cover, a positive potential portion of the electric circuit device will be exposed. The exposed positive potential portion may shorted out coming in contact with the ground portion of a vehicle chassis as it will cause sparks by an electricity charged in the battery.

The AC generator having a protective cover made of FRP has a high structural strength and sufficient quality against a normal level of impact. However, the FRP protective cover has low flexibility, and may fracture or become chipped by a quite large impact at a vehicular collision, etc.

In view of the above issues, the object of the present invention is to provide an AC generator for a vehicle capable of securing the safety by preventing the positive potential portion of the electric circuit device from being exposed by a fracture or a detachment of the plastic protective cover thereof, when a quite large impact such as a secondary impact acts on the AC generator colliding with the structural member of the vehicle chassis or other appliances when the vehicle collided with any obstacle.

SUMMARY OF THE INVENTION

The present invention is made based on a finding that it is effective for improving the safety to make a protective cover soft by such methods as mixing elastomer therein, opposite to conventional methods of reinforcing the plastic of the protective cover by mixing fiberglass therein.

To achieve the above object, a vehicle generator having a circuit protective cover of present invention comprises a housing, an electric circuit device and a protective cover.

The housing encloses a stator on which an armature coil is wound and a rotor located inside the stator to face each other. The electric circuit device is located outside the housing for rectifying AC induced in the armature coil to DC. The protective cover covers the electric circuit device. The protective cover is made of a composite material including a polyamide and an elastomer.

It is desirable that the protective cover has a mechanical properties including: a maximum elongation of 10% or higher; and a Charpy impact strength with notch of 78 kJ/m$^2$ or higher.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 4A is a table showing data of mechanical properties required for the protective cover according to the first embodiment;

FIG. 4B is a table showing data of mechanical properties of a conventional protective cover and of the protective cover according to the first embodiment;

FIG. 4C is a graph of mechanical properties of the conventional protective cover;

FIG. 4D is a graph of mechanical properties of the protective cover according to the first embodiment;

DETAILED DESCRIPTION OF THE PREFERRED EMBODIMENTS (First Embodiment)

Figure 1:
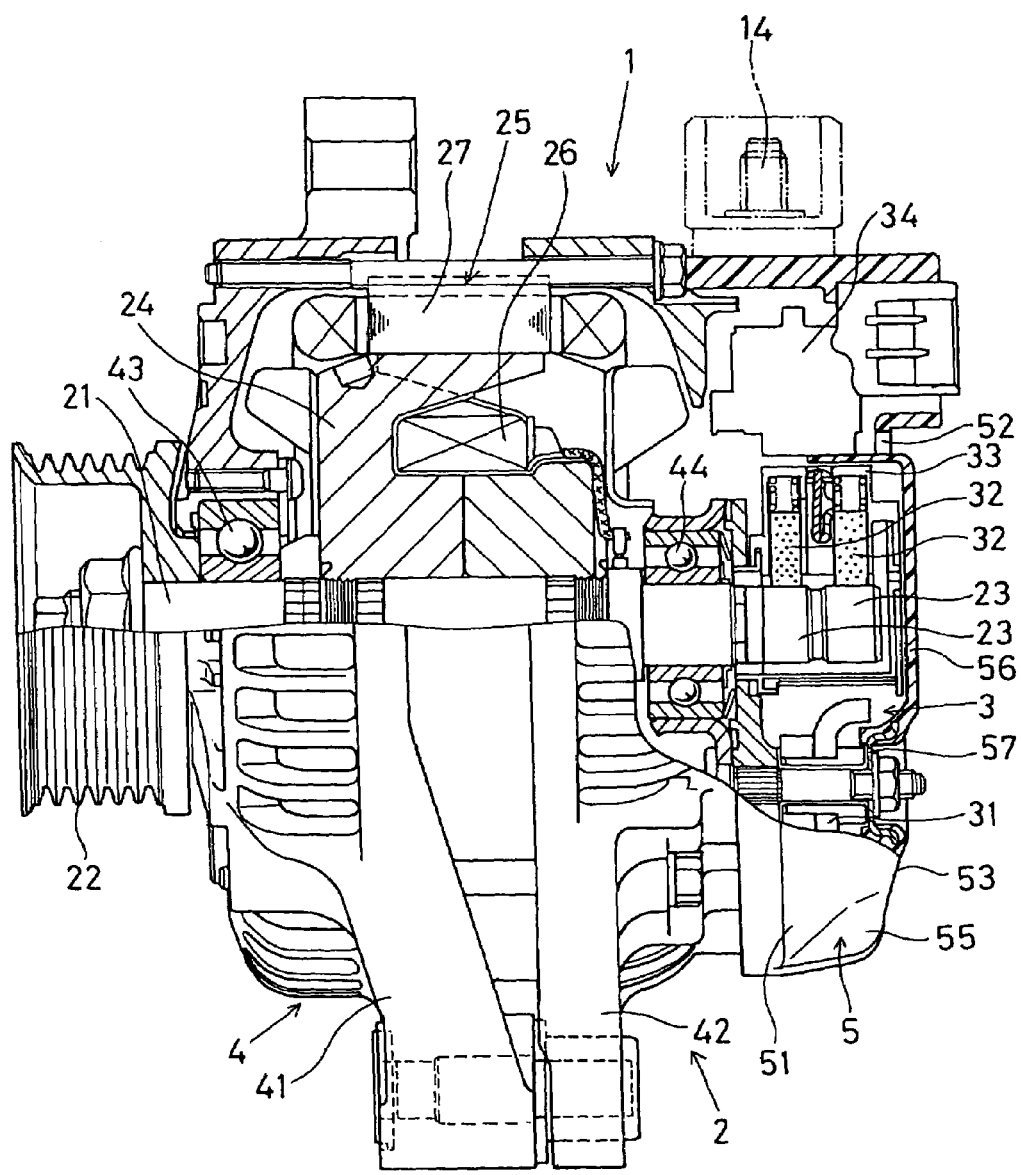
FIG. 1 is a sectional view of a vehicle generator having a circuit protective cover according to a first embodiment of the present invention (taken on line I—I in FIG. 2)
Figure 2:
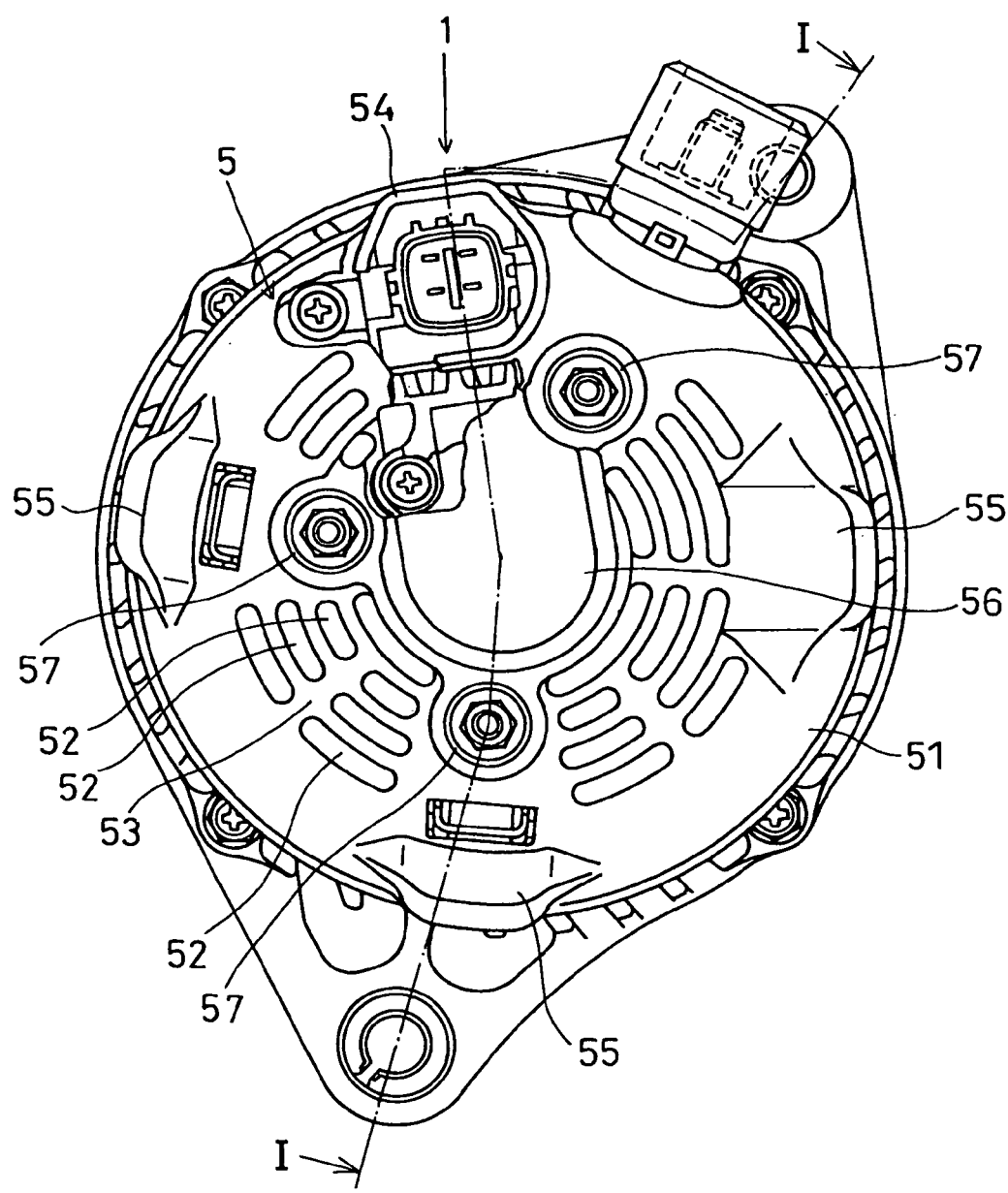
FIG. 2 is a side view of the vehicle generator according to the first embodiment.

FIGS. 1 and 2 depict a three-phase AC generator (alternator) 1 for an automobile according to the first embodiment of the present invention. An engine of the automobile drives the AC generator 1 via a belt. The AC generator 1 charges a storage battery and feeds electric power to respective electronic devices located on the automobile. The AC generator 1 incorporates an alternator 2 and an electric circuit device 3 rectifying three-phase AC to DC.

The alternator 2 has a housing 4 including a drive-side aluminum front end frame 41 and a rear end frame 42, which are fixedly connected to each other. A pair of bearings 43, 44 holds at the center of the housing 4 a rotational shaft 21 of the alternator 2 to extend out of the housing 4. The rotational shaft 21 secures a pulley 22 driven via the belt by the engine at the front end thereof (left end in the figure) and also secures slip rings 23, 23 at the rear end thereof. The rotational shaft 2 secures a rotor 24 at a middle portion thereof (to be enclosed in the housing 4). The internal surface of the housing 4 secures a stator (armature, stator core) 25 to coaxially surround the outer periphery of the rotor 24.

The rotor 24 has a plurality of pole cores at a periphery portion thereof, and a field coil 26 at the central portion thereof. One end of the field coil 26 is connected to an output terminal 14 of the AC generator 1, which is connected to the storage battery, and the other end of the field coil 26 is grounded via a regulator. The stator 25 has slots axially arranged at the internal circumference thereof, which installs an armature coil 27 of the alternator 2, having a three-phase winding at a sixteen-polar full-pitch winding pitch. The three-phase terminals of the armature 27 are connected via the electric circuit device 3 to a positive terminal of the storage battery located outside the alternator system.

The electric circuit device 3 is located behind the rear end frame 42, and rectifies the three-phase AC induced in the armature coil 27 to DC. The electric circuit device 3 is composed with a rectifier 31, a brush 32, a holder holding the brush 32, an IC regulator 34 and so on, and fixed onto the rear side of the rear end frame 42 with screws.

Figure 3A:
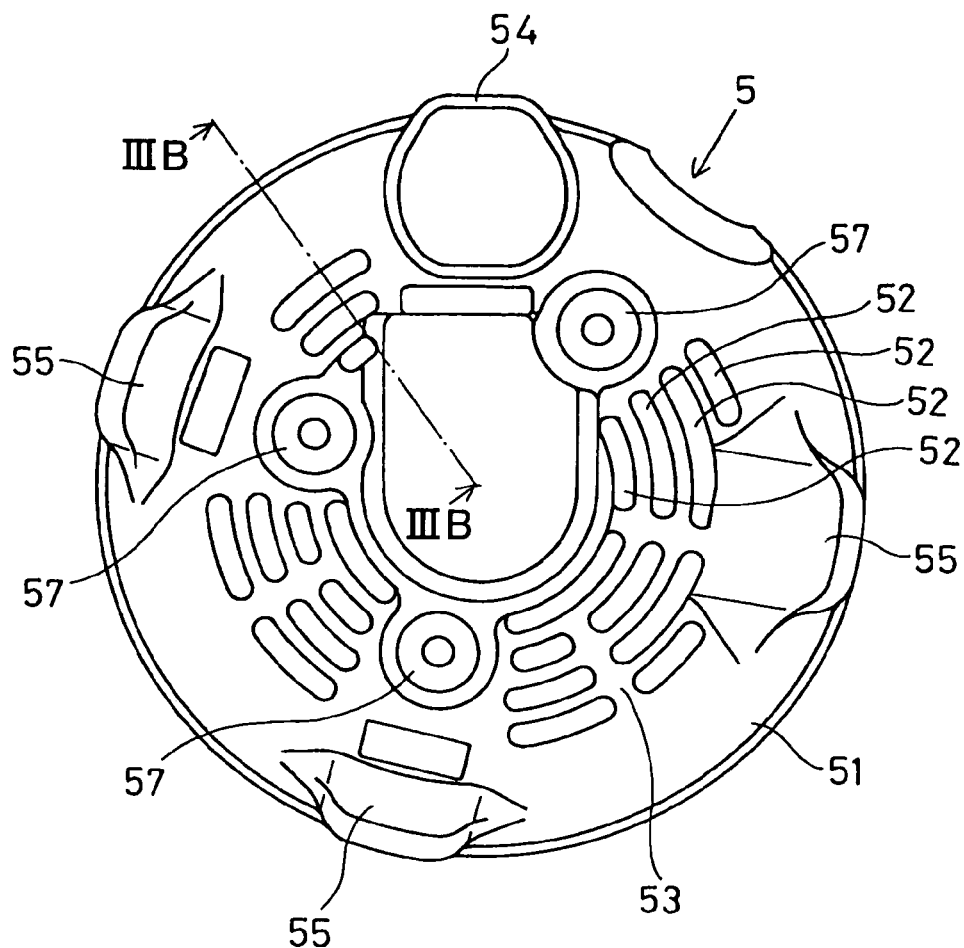
FIG. 3A is a plan view of a protective cover according to the first embodiment.
Figure 3B:
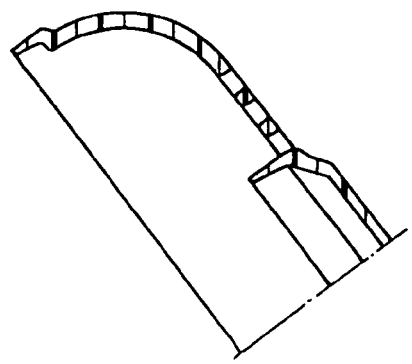
FIG. 3B is a partial sectional view of the protective cover taken on line IIIB—IIIB in FIG. 3A.

As shown in FIG. 3A, a protective resin cover (that is: rear end cover) 5, which has a generally round pan shape and fixed coaxially to the rear end frame 42, covers the electric circuit device 3. The protective resin cover 5 consists of an outer periphery portion 51 rounding frontward and a flat portion 53 having multiple arc-shaped air vents 52. The outer periphery portion has a connector cylinder 54 and a plurality of projections 55. The flat portion 53 has a brush holding housing 56 and secures three metallic plates 57, which are located coaxially at a predetermined interval and each of which has a screw hole for fixing the protective resin cover 5 to the housing 4.

The protective resin cover 5 of this requires the mechanical properties shown in FIG. 4A, that is: the maximum elongation of 10% or higher; and the Charpy impact strength (with notch) of 78 kJ/m². It is desirable that the maximum elongation is 100% or higher. It is practical that Izod impact strength (23° C., with notch, ⅛ inch) is set between 500 J/m and 2000 J/m. These mechanical properties securely prevents the protective resin cover 5 from fracturing and being detached from the housing 4, by flexible deformation of the protective resin cover 5 when the engine mounted on the vehicle chassis with rubber moves causing a secondary collision thereof with vehicle chassis, etc., in a case of a vehicular collision. Thus, the protective resin cover 5 keeps the positive potential portion of the electric circuit device 3 from contact with a ground portion of the vehicle not to cause sparks by a discharge of the electricity in the battery.

The left column in FIG. 4B and FIG. 4C shows a mechanical properties and a stress-strain curve of a conventional protective FRP cover made by mixing fiberglass with nylon-6,6 (PA66). The right column in FIG. 4B and FIG. 4D shows a mechanical properties and a stress-strain curve of the protective resin cover 5 made by mixing elastomer with nylon-6,6 (PA66).

The protective resin cover 5 of this embodiment endures a significantly large strain against the tensile stress, as shown in the stress-strain curve of FIG. 4D. The flexibility and the impact strength makes the protective resin cover 5 deform in an instant at the secondary collision, securely preventing the protective resin cover 5 from fracturing and being detached from the housing 4. Thus, the flexibility and the impact strength reduce short-circuiting.

(Second Embodiment)

Figure 5A:
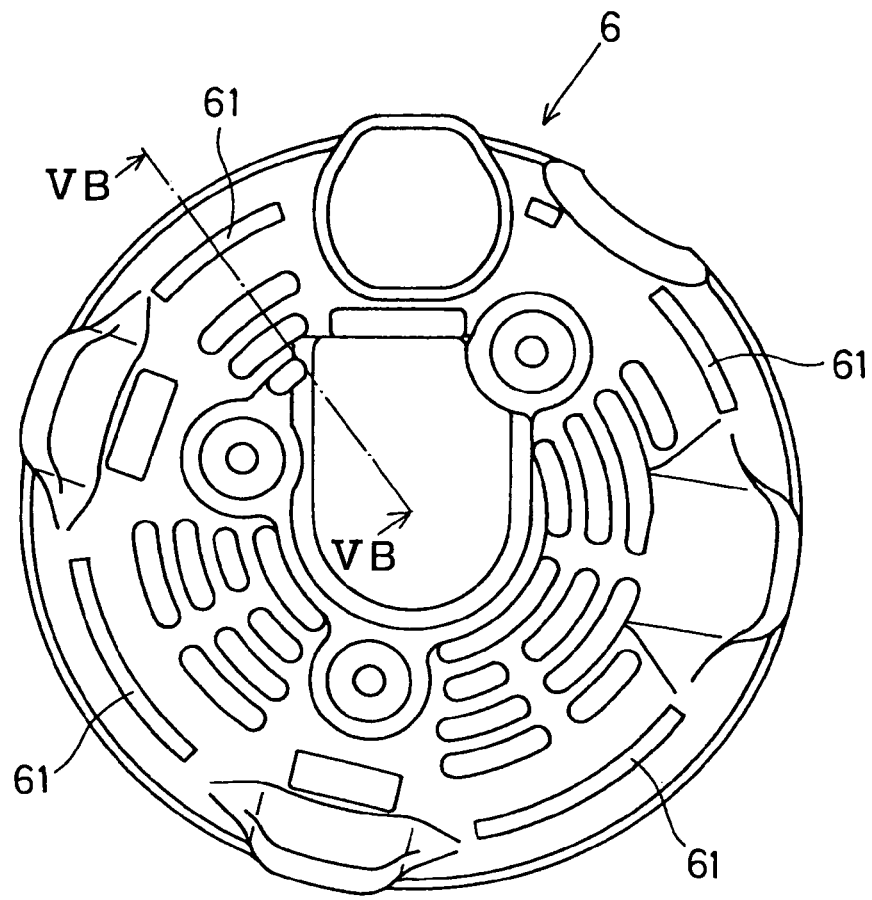
FIG. 5A is a plan view of a protective cover according to a second embodiment of the present invention.
Figure 5B:
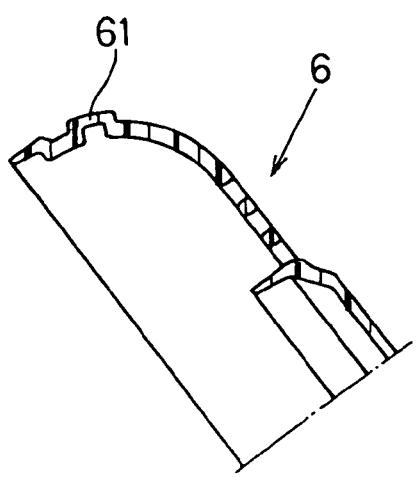
FIG. 5B is a partial sectional view of the protective cover taken on line VB—VB in FIG. 5A.

FIGS. 5A and 5B depict a protective cover 6 of an AC generator according to the second embodiment. The protective cover 6 has extendable portions 61, which are arc-shaped lines projecting on an outer face and concaving on an inner face thereof, along the periphery of the protective cover 6. The protective cover 6 may have a plurality of the arc-shaped lines aligning side by side in a radial direction of the protective cover 6. This AC generator 1 keeps the positive potential portion of the electric circuit device 3 from contact with the ground portion such as the vehicle chassis, by the extendable portion 61 deforming at the secondary impact to the vehicle chassis, etc., so as to prevent the protective cover 6 from fracturing.

(Third Embodiment)

Figure 6A:
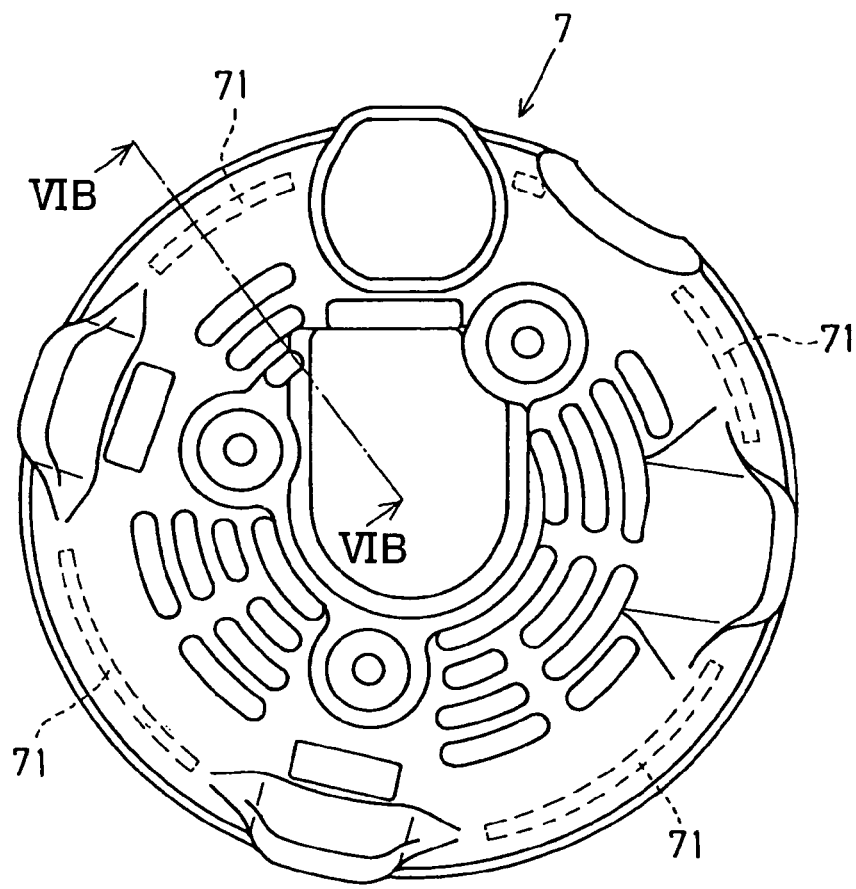
FIG. 6A is a plan view of a protective cover according to a third embodiment of the present invention.
Figure 6B:
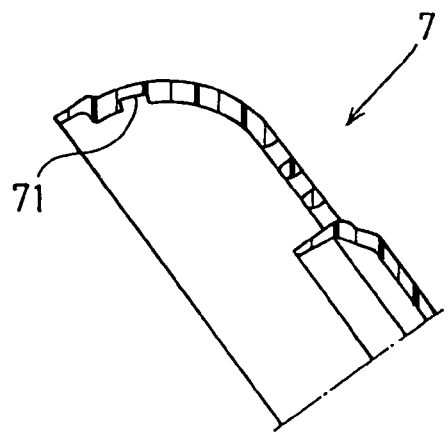
FIG. 6B is a partial sectional view of the protective cover taken on line VIB—VIB in FIG. 6A.

FIGS. 6A and 6B depict a protective cover 7 of an AC generator according to the third embodiment. The protective cover 7 has thin-walled portions 71, arc-shaped grooves inside the outer periphery portion thereof. A plurality of the thin-walled portions 71 may be provided to align side by side in a radial direction of the protective cover 7. This AC generator 1 prevents the protective cover 7 from fracturing at portions close to the positive potential portion, because the protective cover 7 fractures selectively at the thin-walled portions 71 at the secondary impact to the vehicle chassis. Thus, the protective cover 7 effectively prevents itself from fracturing at portions covering the positive potential portion of the electric circuit device 3, which is required for electric insulation.

The AC generator according to the present invention serves to improve the safety by preventing uncovering the electric circuit device 3, by preventing the protective cover (rear end cover) covering the positive potential portion of the electric circuit device 3 from fracturing, even when the AC generator 1 suffers a secondary collision by a vehicular collision.

What is claimed is:

1. A generator for a vehicle comprising:
   a housing enclosing a stator on which an armature coil is wound and a rotor located inside the stator to face each other;
   an electric circuit device located outside the housing for rectifying an AC induced in the armature coil to a DC; and
   a protective cover covering the electric circuit device,
   wherein the protective cover is made of a composite material including a polyamide and an elastomer.

2. The generator according to claim 1,
   wherein the protective cover has a mechanical properties including:
   a maximum elongation of 10% or higher; and
   a Charpy impact strength with notch of 78 kJ/m² or higher.

3. A generator for a vehicle comprising:

a housing enclosing a stator on which an armature coil is wound and a rotor located inside of the stator to face each other;

an electric circuit device located behind the housing for rectifying an AC induced in the armature coil to a DC; and a protective cover covering the electric circuit device, wherein the protective cover has at least one extendable portion, which is more flexible than other portions of the protective cover.

4. A generator for a vehicle comprising:

a housing enclosing a stator on which an armature coil is wound and a rotor located inside of the stator to face each other;

an electric circuit device located behind the housing for rectifying an AC induced in the armature coil to a DC; and a protective cover covering the electric circuit device, wherein the protective cover has at least one thin-walled portion, which fractures preceding the other portions of the protective cover.

5. The generator according to claim 3, wherein the extendable portion has an arc-shape extending on a peripheral portion of the protective cover.

6. The generator according to claim 4, wherein the thin-walled portion has an arc-shape extending on a peripheral portion of the protective cover.

* * * * *